(12) United States Patent
Tokiwa

(10) Patent No.: US 6,835,795 B2
(45) Date of Patent: Dec. 28, 2004

(54) FUNCTIONALIZED POLYPHENYLENE ETHER RESIN

(75) Inventor: Tetsuji Tokiwa, Sodegaura (JP)

(73) Assignee: Asahi Kasei Kabushiki Kaisha, Osaka (JP)

(*) Notice: Subject to any disclaimer, the term of this patent is extended or adjusted under 35 U.S.C. 154(b) by 118 days.

(21) Appl. No.: 10/240,023

(22) PCT Filed: Jan. 24, 2002

(86) PCT No.: PCT/JP02/00514
§ 371 (c)(1),
(2), (4) Date: Sep. 25, 2002

(87) PCT Pub. No.: WO02/059180
PCT Pub. Date: Aug. 1, 2002

(65) Prior Publication Data
US 2003/0130474 A1 Jul. 10, 2003

(30) Foreign Application Priority Data
Jan. 25, 2001 (JP) ........ 2001-016549
Jan. 25, 2001 (JP) ........ 2001-016550

(51) Int. Cl.$^7$ ............................................. C08G 65/00
(52) U.S. Cl. .................... 528/86; 528/271; 528/501; 528/502 R; 528/503
(58) Field of Search ............... 528/86, 271, 561, 528/502 R, 503

(56) References Cited

U.S. PATENT DOCUMENTS 4,456,736 A 6/1984 Miyashita et al.

FOREIGN PATENT DOCUMENTS

| | | |
|---|---|---|
| EP | 1 211 290 A1 | 6/2002 |
| JP | 1-297428 | 11/1989 |
| JP | 2-305854 | 12/1990 |
| JP | 6-122762 | 5/1994 |
| JP | 4-109320 | 4/1995 |
| JP | 07109320 | 4/1995 |
| JP | 8-239567 | 9/1996 |
| JP | 8-245872 | 9/1996 |
| JP | 2000-191769 | 7/2000 |
| JP | 2001-19839 | 1/2001 |
| JP | 2001-302738 | 10/2001 |
| JP | 2001-302739 | 10/2001 |
| JP | 2001-302873 | 10/2001 |
| JP | 2001-302901 | 10/2001 |
| WO | WO 00/52074 | 9/2000 |

OTHER PUBLICATIONS

Supplementary European Search Report dated Feb. 17, 2003.

Primary Examiner—Duc Truong
(74) Attorney, Agent, or Firm—Dickstein, Shapiro, Morin & Oshinsky, LLP.

(57) ABSTRACT

The present invention relates to a functionalized polyphenylene ether which has, in its molecule, at least one functional group selected from a carboxyl group, an acid anhydride group, an amino group, an amide group, an imide group, a silyl group, a hydroxyl group and a glycidyl group, and which gives a proton NMR spectrum with a peak area ratio (A)/(B) of 0.0001 or greater, wherein (A) is the area of peaks at chemical shifts from 2.95 to 3.04 ppm, and (B) is the area of peaks at chemical shifts from 6.00 to 6.90 ppm. Having a novel structure that has not been obtained by conventional techniques, the functionalized polyphenylene ether of the present invention has an excellent color tone, contains little black foreign substance, and provides polymer alloys with superior mechanical characteristics when blended with different polymers, and therefore makes it possible to provide products and parts in various industrial fields that will sufficiently meet the industrial demands.

23 Claims, 2 Drawing Sheets

FUNCTIONALIZED POLYPHENYLENE ETHER RESIN

TECHNICAL FIELD

This invention relates to a functionalized polyphenylene ether resin useful as a plastic material in the fields of electrical and electronic products, automobiles and other industrial materials, and foods and packaging fields and to a process of producing the same.

BACKGROUND ART

Polyphenylene ethers are excellent in processability and productivity. They can be molded by melt injection, melt extrusion and similar molding techniques into products or parts of desired shapes with good productivity. Therefore they have been widely used as a material of products and parts in the electrical and electronic fields, automobile field, and other industrial materials fields, and foods and packaging fields.

In the electrical and electronic fields, automobile field and other various industrial fields, products and parts have now come to be widely diverse, and requirements for resin materials therefor have also been diversified. To meet the requirements, polymer composite (combination of existing polymers with other materials) technology and polymer alloy (combination of existing polymers) technology have led to resin materials with characteristics not possessed by existing materials.

General polyphenylene ethers, while excellent in heat resistance and mechanical characteristics, have poor compatibility with other materials, and the choice of materials to be combined with is limited. They have particularly poor compatibility with highly polar materials such as polyamide and need to be functionalized to be combined with such resins.

With respect to functionalized polyphenylene ethers, JP-B-3-52486, U.S. Pat. Nos. 4,654,405 and 4,888,397, and JP-A-63-54425 propose processes in which polyphenylene ether in a molten state is allowed to react with a reactive functionalizer, such as maleic anhydride, in the presence or absence of a radical initiator. However, the proposed processes involve very high temperatures for melting the resin, which cause various problems arising from thermal deterioration of the resin, such as color change, formation of black gel, and poor color tone or appearance.

European Patent 546497, JP-A-4-239036, and JP-A-3-35020 teach processes in which a mixture of polyphenylene ether and a functionalizer, such as maleic anhydride, in a prescribed mixing ratio is allowed to react in a solvent capable of dissolving polyphenylene ether. These processes achieve only a low functionalization reaction rate and, besides, resin compositions obtained by blending the resulting functionalized polyphenylene ether with different polymers are of low utility as a material due to their inferior mechanical characteristics.

JP-A-2-276823 discloses polyphenylene ether with a 6-chroman end group to which a functional group, e.g., a carboxyl group or an oxidized acyl group, is bonded. In all the working Examples given, however, polyphenylene ether is melted at a high temperature (300° C. or 320° C.). The resulting functionalized polyphenylene ether resins were found to have a poor color tone and to contain considerable black foreign substance which is a scorched resin.

JP-A-12-191769 and WO 00/52074 disclose a process of obtaining functionalized polyphenylene ether by allowing polyphenylene ether in a solid state to react with a functionalizing compound. According to the disclosed process, because the reaction is preceded by mixing polyphenylene ether with a solid or liquid functionalizing compound in a predetermined ratio, the functionalization reaction rate is extremely low so that resin compositions obtained by blending the resulting functionalized polyphenylene ether and different polymers have inferior mechanical characteristics and low practicability as a material.

JP-B-63-7204 proposes supplying a radical polymerizable compound in a gaseous phase to polyphenylene ether in the presence of an organic or inorganic radical polymerization initiator. The process involves the problem that the functionalizing compound itself is apt to homopolymerize, failing to be added to polyphenylene ether efficiently.

As mentioned above, functionalized polyphenylene ether resins obtained by conventional techniques have an unsatisfactory balance between color or appearance and mechanical properties for sufficiently fulfilling the demands of industrial fields.

The present invention relates to a functionalized polyphenylene ether which has an excellent color tone, contains little black foreign substance, and provides polymer alloys with superior mechanical characteristics when blended with other resins.

DISCLOSURE OF THE INVENTION

Figure 1:
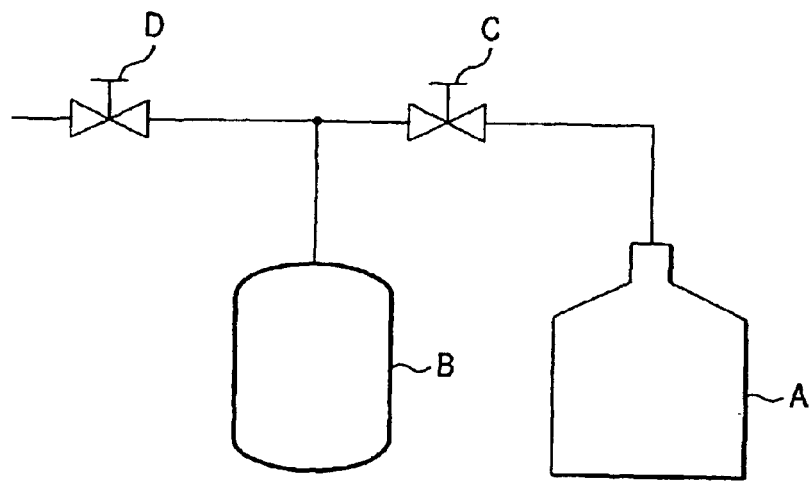
FIG. 1 is a schematic of an apparatus for obtaining a functionalized polyphenylene ether, which is used in Example 1.

The present inventor conducted extensive investigations on the structure of functionalized polyphenylene ethers, and found as a result that a functionalized polyphenylene ether giving a proton NMR spectrum with a peak area ratio (A)/(B) of 0.0001 or greater, wherein (A) is the area of peaks at chemical shifts from 2.95 to 3.04 ppm, and (B) is the area of peaks at chemical shifts from 6.00 to 6.90 ppm, has an excellent color tone, contains little black foreign substance, and provides polymer alloys having superior mechanical characteristics when blended with different polymers and have thus reached the present invention.

The present invention provides a functionalized polyphenylene ether which has, in its molecule, at least one functional group selected from a carboxyl group, an acid anhydride group, an amino group, an amide group, an imide group, a silyl group, a hydroxyl group and a glycidyl group, and which gives a proton NMR spectrum with a peak area ratio (A)/(B) of 0.0001 or greater, wherein (A) is the area of peaks at chemical shifts from 2.95 to 3.04 ppm, and (B) is the area of peaks at chemical shifts from 6.00 to 6.90 ppm.

The present invention also relates to a process of producing a functionalized polyphenylene ether comprising:

allowing polyphenylene ether to react with at least one functionalizing compound having in its molecule thereof (i) at least one carbon-carbon double bond or triple bond and (ii) at least one functional group selected from the group consisting of a carboxyl group, an acid anhydride group, an amino group, an amide group, an imide group, a silyl group, a hydroxyl group and a glycidyl group, wherein the functionalizing compound is supplied in a gaseous state to the polyphenylene ether and allowed to react with the polyphenylene ether of a solid state at or below the melting temperature of the polyphenylene ether.

BEST MODE FOR CARRYING OUT THE INVENTION

The functionalized polyphenylene ether according to the present invention is made up of phenylene ether units represented by general formula (1) and has a functional group in the molecule thereof:

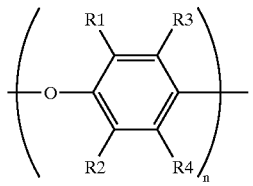

(1)

wherein $R^1$, $R^2$, $R^3$, and $R^4$ each represent a hydrogen atom, an alkyl group or an alkyl group having an amino group. The one in which $R^1$ and $R^2$ each is a hydrogen atom, and $R^3$ and $R^4$ each is a methyl group is preferred.

The functional group possessed by the functionalized polyphenylene ether of the present invention is a carboxyl group, an acid anhydride group, an amino group, an amide group, an imide group, a hydroxyl group or a glycidyl group, with an acid anhydride group and a glycidyl group being preferred.

The functionalized polyphenylene ether of the present invention shows a proton NMR spectrum in which the ratio ((A)/(B)) of peak area (A) between chemical shifts 2.95 and 3.04 to peak area (B) between 6.00 and 6.90 ppm is 0.0001 or greater, preferably 0.001 or greater.

The proton NMR spectrum of the functionalized polyphenylene ether of the present invention is measured at room temperature with an NMR measuring system having a frequency of 400 MHz or higher on a sample prepared by dissolving the functionalized polyphenylene ether in trimethylsilane-containing deutero-chloroform. The chemical shift for each peak in the NMR spectrum was decided by taking the peak assigned to the protons of tetramethylsilane as 0.00 ppm.

The peak area ratio (A)/(B) according to the present invention is equal to the ratio of integrals of the peaks.

The peaks between 2.95 and 3.04 ppm appearing in the proton NMR spectrum of the functionalized polyphenylene ether of the present invention do not appear with starting polyphenylene ethers nor with starting polyphenylene ethers which have been heat treated under the same temperature condition as used in the reaction but without being mixed with any functionalizer. It is considered from these facts that these peaks are attributable to the structure of the polyphenylene ether moiety having the functional group bonded, which structure has not been elucidated as yet.

The functionalized polyphenylene ether and the starting polyphenylene ether preferably have a reduced viscosity ranging from 0.15 to 1.0 dl/g, particularly 0.20 to 0.70 dl/g, in a 0.5 g/dl chloroform solution at 30° C.

It is preferred that the functionalized polyphenylene ether of the present invention and the starting polyphenylene ether be in a solid state. Preferred solid forms include powder and pellets, with powder being still preferred. Polyphenylene ethers of powder form are obtainable by, for example, dissolving a polyphenylene ether in a good solvent, such as toluene, xylene, chloroform or chlorobenzene, and adding a poor solvent, such as methanol or acetone, to the solution. For ease of handling the powder obtained by this method preferably has a particle size between 10 μm and 1,000 μm.

It is preferred for the functionalized polyphenylene ether of the present invention and the starting polyphenylene ether to be crystalline powder having a melting point ranging 200 to 260° C. Literature furnishing the information about the relation between crystalline polyphenylene ethers and their melting points include, for example, Journal of Polymer Science, Part A, 2(6), pp. 1141–1148 (1968), European Polymer Journal, (9), pp. 293–300 (1973), and Polymer, (19), pp. 81–84 (1978).

The melting point of polyphenylene ethers as referred to in the present invention is defined to be the peak top temperature of the peak observed in a temperature-heat flow rate plot obtained with temperature rising at 20° C./min in differential scanning calorimetry (DSC). Where the plot has a plurality of peak top temperatures, the melting point of the polyphenylene ether is defined to be the highest one.

The functionalized polyphenylene ether of the present invention can contain appropriate additive(s) according to the use. The additives include flame retardants, heat stabilizers, antioxidants, UV absorbers, surface active agents, lubricants, fillers, polymer additives, dialkyl peroxides, peroxy, peroxycarbonates, hydroperoxides, and peroxy ketals.

The functionalized polyphenylene ether according to the present invention can be obtained by supplying a functionalizing compound in its gaseous state to a polyphenylene ether in its solid state and allowing the functionalizing compound to react with the solid polyphenylene ether at or below the melting temperature of the polyphenylene ether.

In the production process of the present invention, it is preferred that the polyphenylene ether reacting with the functionalizing compound be in a solid state. Where the polyphenylene ether is allowed to react in its molten state with the functionalizing compound, an increase of black foreign substance or deterioration of appearance such as yellowing can result, and no peaks appears in the range from 2.95 to 3.04 ppm in the proton NMR spectrum. Where the polyphenylene ether in a dissolved state in a solvent, e.g., toluene or chlorobenzene, is made to react with the functionalizing compound, peaks do not appear in the range from 2.95 to 3.04 ppm in the proton NMR spectrum, either, and the polymer alloys with other resins have low mechanical characteristics.

The functionalizing compound which can be used in the present invention comprises at least one organic compound having in the molecule thereof at least one carbon-carbon double bond or triple bond and at least one functional group selected from the group consisting of a carboxyl group, an acid anhydride group, an amino group, an amide group, an imide group, a silyl group, a hydroxyl group and a glycidyl group. Of such functionalizing compounds preferred are those having a double bond and at least one carboxyl group, acid anhydride group, imido group or glycidyl group in the molecule thereof.

Specific examples include maleic anhydride, itaconic anhydride, maleic acid, fumaric acid, phenylmaleimide, itaconic acid, methacrylic acid, acrylic acid, glycidyl methacrylate, glycidyl acrylate, allyl glycidyl ether, hydroxyalkyl methacrylate compounds, and 2-dimethylaminoalkyl compounds. Among them, maleic anhydride is extremely preferred.

In the production process of the present invention, the functionalizing compound is desirably supplied in its gaseous state to the polyphenylene ether.

Where the functionalizing compound is supplied in a liquid or solid state, the reaction will be extremely slow because the process of the functionalizing compound's penetrating into the solid polyphenylene ether is the rate-determining step. As a result, the number of the functional groups introduced into the polyphenylene ether within a prescribed time will be much smaller than in the case where the functionalizing compound is fed in a gaseous state. Further, the peak area between 2.95 and 3.04 ppm will be extremely small. The functionalizing compound can be supplied by, for example, directly feeding a vaporized functionalizing compound or feeding a functionalizing compound as diluted with an inert gas. The inert gas includes helium, argon, and nitrogen, with nitrogen being particularly preferred.

In diluting a gaseous functionalizing compound with an inert gas, the volume concentration of the functionalizing compound is preferably 1% or higher. The volume concentration of the functionalizing compound is obtained from the saturated vapor pressure at a temperature for vaporizing the functionalizing compound. For instance, when maleic anhydride reaches gas-liquid equilibrium in a nitrogen atmosphere at 190° C. under ambient pressure, the volume concentration of maleic anhydride in the gas phase is 79%. The higher the volume concentration of a functionalizing compound, the higher the reaction rate as is preferred.

It is particularly advisable in the present invention that a gaseous functionalizing compound be continuously fed to a polyphenylene ether so that the functionalizing compound may have a linear velocity with respect to the polyphenylene ether. In this case, there is obtained an increased rate of the elementary process of the functionalizing compound's diffusing along the polyphenylene ether particle surface across the gas film surrounding the particles, which results in an increased reaction rate. In making a gaseous functionalizing compound to flow, a higher linear velocity of the gas with respect to the polyphenylene ether results in a higher reaction rate. However, the amount of scattering powder increases with the increasing linear velocity to cause an increased loss of the powder. Accordingly, a preferred linear velocity of the gaseous functionalizing compound with respect to the polyphenylene ether ranges from 0.05 m/sec to 10 m/sec.

A preferred temperature in the reaction between the functionalizing compound and the polyphenylene ether is 110 to 230° C., particularly 155 to 230° C. The higher the reaction temperature, the higher the reaction rate. Nevertheless, a reaction temperature exceeding 230° C. will cause the polyphenylene ether to melt, which results in deteriorated color tone.

In the present invention a radical initiator can be added to accelerate the reaction. Organic peroxides are preferably used as radical initiators.

When the gaseous functionalizing compound and the polyphenylene ether are brought into contact to react with each other according to the present invention, the polyphenylene ether may be either allowed to stand still or stirred in a reaction vessel. The reaction apparatus to be used where the polyphenylene ether is allowed to react while being stirred includes, but is not limited to, a Henschel mixer, a paddle mixer, and a paddle drier. A Henschel mixer is particularly preferred.

The functionalized polyphenylene ether according to the present invention is widely applicable in the electrical and electronic fields, automobile and other industrial fields, and food and packaging fields.

Polymer alloys obtained by melt kneading the functionalized polyphenylene ether of the present invention and polyamide, polyimide or polyester are excellent in color tone, appearance, mechanical characteristics, and productivity and therefore useful with great advantages in applications in the electrical and electronic fields, automobile and other industrial fields, and food and packaging fields.

The present invention will be illustrated in greater detail with reference to the following Examples, but the invention should not be construed as being limited thereto.

Method of Evaluation (1) Determination of Added Carboxyl Groups and Acid Anhydride Groups in Functionalized Polyphenylene Ether:

First of all, functionalized polyphenylene ether particles as obtained by the reaction were cleaned in heated acetone for 3 hours or longer in a Soxhlet extractor to remove the unreacted functionalizing compound remaining on the particles. Where the functionalized polyphenylene ether after the reaction was melted or pelletized by use of an extruder, it was thoroughly ground to powder in a mortar and subjected to this cleaning operation. The cleaned polymer was dried at 150° C. under reduced pressure of 0.1 mmHg for 1 hour. An aliquot of the dried powder was dissolved in chloroform, and the solution was analyzed by gas chromatography. Complete disappearance of the peaks corresponding to the functionalizing compound provided confirmation that no unreacted functionalizing compound remained on the dried functionalized polyphenylene ether.

The amount of added carboxyl groups and acid anhydride groups in the functionalized polyphenylene ether thus cleaned and dried were determined by titration using phenolphthalein as an indicator. Specifically, 1 g of the functionalized polyphenylene ether was weighed out and put in a 500 ml Erlenmeyer flask. To the flask was added 200 ml of toluene to completely dissolve the functionalized polyphenylene ether. Two or three drops of an ethanolic solution of phenolphthalein were added to the solution, and a 0.01 mol/l methanol solution of sodium methylate was added thereto dropwise from a burette until the whole solution assumed pink. The amount of added carboxyl groups and acid anhydride groups was obtained from the volume of the dropwise added methanol solution of sodium methylate.

(2) Color Tone of Functionalized Polyphenylene Ether:

In 10 ml of chloroform was dissolved 0.5 g of a functionalized polyphenylene ether, and the solution was put in a quartz cell having an optical path length of 1 cm. The absorbance of the cell at 480 nm was measured with a spectrophotometer, and the measured value was multiplied by 20. A higher measured value indicates that the polyphenylene ether has undergone thermal deterioration during the reaction, which means color tone deterioration. The color tone measured value of the starting polyphenylene ether powder was 0.23.

(3) Number of Black Foreign Substance Particles Present in Functionalized Polyphenylene Ether:

In 50 ml of chloroform was dissolved 5 g of a functionalized polyphenylene ether, and the solution was filtered through filter paper of 10 cm in diameter. After the filtration, the black foreign substance particles on the filter paper were counted with the naked eye. The starting polyphenylene ether powder contained no black foreign substance.

(4) Reduced Viscosity of Polyphenylene Ether:

The reduced viscosity of the starting polyphenylene ether used for functionalization was found to be 0.43 dl/g as measured as a 0.5 g/100 ml solution in chloroform at 30° C. with a Ubbellohde viscometer.

(5) Proton NMR Measurement of Functionalized Polyphenylene Ether:

A functionalized polyphenylene ether obtained through the purification operation of (1) above was dissolved in deutero-chloroform in a concentration of 2 wt %. A trace amount of tetramethylsilane was added to the solution as a standard. Measurement was made at room temperature and 400 MHz NMR. In the NMR spectrum the chemical shift of each peak was decided taking the protons of tetramethylsilane as 0.00 ppm.

(6) Melt Kneading of Functionalized Polyphenylene Ether and Polyamide Resin Composition and Method of Evaluating Polymer Alloys:

The reaction product obtained in Examples and Comparative Examples was allowed to dry on standing at 150° C. in vacuum for 10 hours. Thirty parts by weight of the dried functionalized polyphenylene ether powder, 6 parts by weight of a hydrogenated styrene-butadiene block copolymer, 59 parts by weight of a polyamide 66 resin, and 5 parts by weight of a polyamide 6 resin were mixed well and kneaded and extruded at 320° C. by means of a twin-screw extruder ZSK-25 supplied by Werner to obtain pellets. The pellets were molded by an injection molding machine into a test specimen according to ASTM standards, of which a notched Izod impact strength (ASTM D-256; 23° C.) was measured.

(7) Measurement of Melting Points of Starting Polyphenylene Ether and Functionalized Polyphenylene Ether:

The peak top of the peak observed in a temperature-heat flow rate plot obtained with temperature rising at 20° C./min in differential scanning calorimetry (DSC) was taken as a melting point. The melting point of the starting polyphenylene ether used for functionalization was 238° C.

EXAMPLE 1

Figure 2:
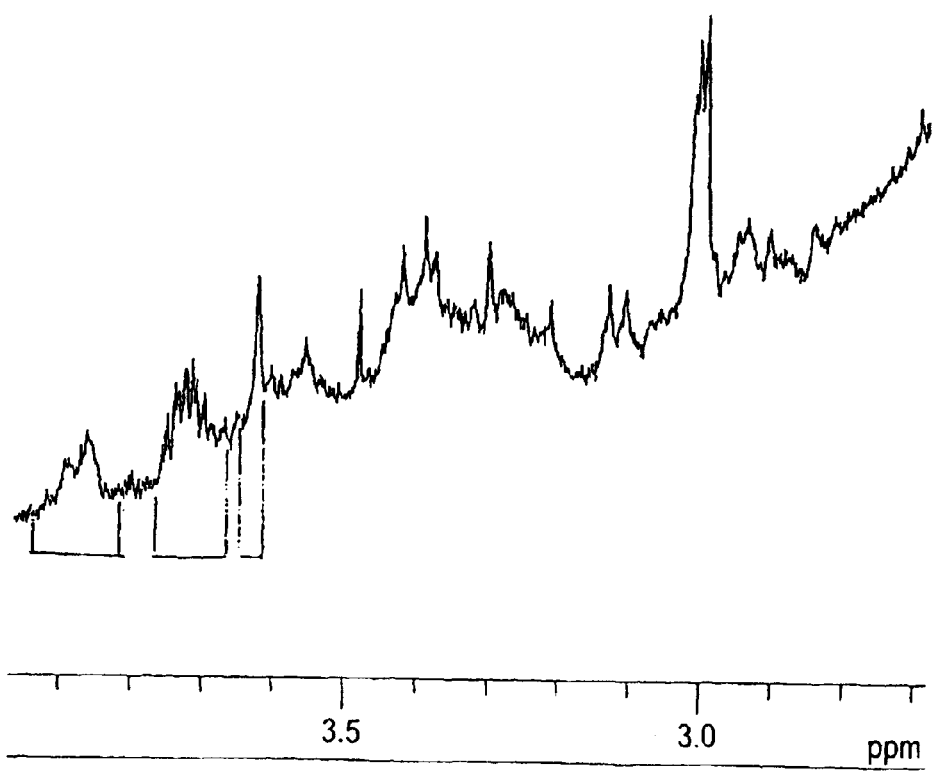
FIG. 2 is a proton NMR spectrum of the functionalized polyphenylene ether obtained in Example 1.

The apparatus used in Example 1 is shown in FIG. 1. In a 10 liter-volume reactor B was put 2 kg of polyphenylene ether powder. A 10 liter-volume maleic anhydride evaporator A was connected to the reactor B via a valve C. Both the reactor B and the evaporator A were equipped with a jacket, in which hot, temperature-controlled oil was circulated to adjust the polyphenylene ether powder or maleic anhydride in the container at a desired temperature. In the evaporator A was put 400 g of maleic anhydride. Both the reactor B and the evaporator A were evacuated to 0.1 mmHg or less by means of a vacuum pump connected via a valve D, and the valve D was closed. Then, the jacket temperatures were adjusted so as to raise the temperatures of the maleic anhydride in the evaporator A and the polyphenylene ether powder in the reactor B to 190° C. The valve C was opened little by little, whereupon gaseous maleic anhydride from the evaporator A was introduced into the reactor tank B. At this time point, the valve C was switched off, and the reactor B was closed tight. The reactor was allowed to stand for 60 minutes while maintaining the temperature and the pressure and then cooled in a water tank. After room temperature was reached, the tank was opened to take out powder of functionalized polyphenylene ether. In Table 1 are shown the amount of added maleic anhydride in the functionalized polyphenylene ether, the color tone measured value, the number of black foreign substance particles, and the peak area ratio (A)/(B) in proton NMR measurement, i.e., the ratio of (A) the area of peaks in chemical shifts 2.95 to 3.04 mm to (B) the area of peaks in chemical shifts 6.00 to 6.90 ppm. The proton NMR spectrum is shown in FIG. 2.

EXAMPLES 2 TO 6

The procedure of Example 1 was repeated, except that the reaction time and temperature were changed. The analytical results of the functionalized polyphenylene ether are shown in Table 1.

COMPARATIVE EXAMPLES 1 TO 3

The procedure of Example 1 was repeated, except that the reaction temperature was changed. The polyphenylene ether melted and adhered to the wall of the reactor. The analytical results obtained are shown in Table 1.

EXAMPLE 7

Figure 3:
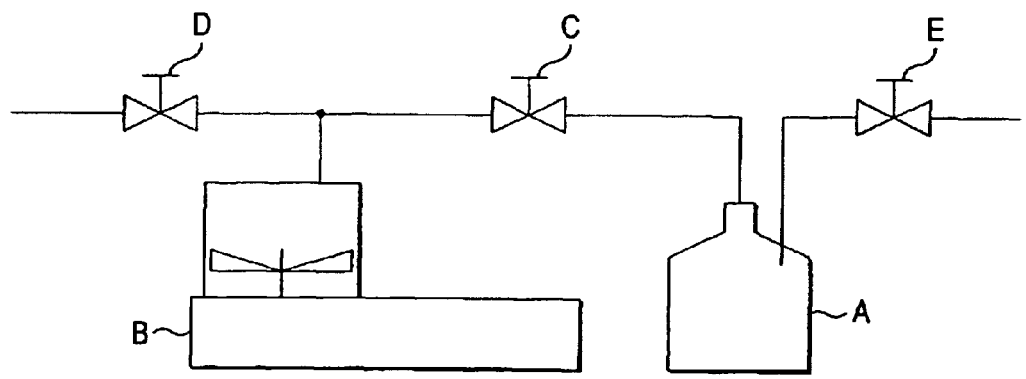
FIG. 3 is a schematic of an apparatus for obtaining a functionalized polyphenylene ether, which is used in Example 7.

The apparatus used in Example 7 is shown in FIG. 3. In a 10 liter-volume Henschel mixer B was put 2 kg of polyphenylene ether powder. The Henschel mixer B was connected to the same evaporator A as used in Example 1, which contained 400 g of maleic anhydride, via a valve C. Oil at 190° C. was delivered to each of the jackets of the Henschel mixer B and the evaporator A to raise the temperatures of the polyphenylene ether powder and the maleic anhydride to 190° C. With valves C, D and E open, 2 liter/min of nitrogen was made to flow through the valve E, whereby a mixed gas of gaseous maleic anhydride and nitrogen was fed to the Henschel mixer. Simultaneously with the start of nitrogen feed, the stirring equipment of the Henschel mixer was started up to rotate the stirring blades at 600 rpm to stir the polyphenylene ether powder. After mixing by stirring for 60 minutes, the powder was taken out from the mixer.

EXAMPLES 8 TO 13

The procedure of Example 7 was repeated, except that the reaction time and temperature were changed. The analytical results of the functionalized polyphenylene ether are shown in Table 2.

COMPARATIVE EXAMPLES 4 TO 6

The procedure of Example 7 was repeated, except that the reaction temperature was changed. The polyphenylene ether melted and adhered to the wall of the reactor. The analytical results obtained are shown in Table 2.

EXAMPLE 14

Figure 4:
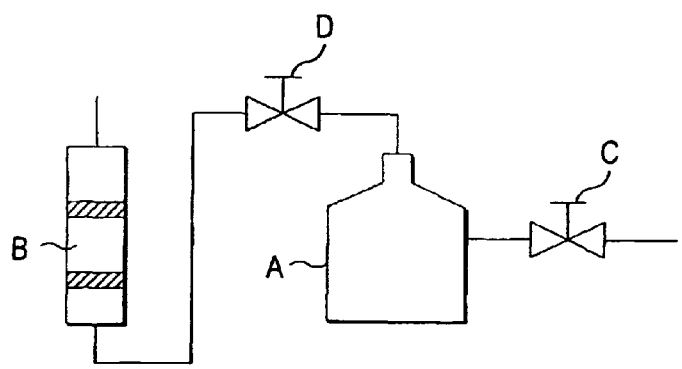
FIG. 4 is a schematic of an apparatus for obtaining a functionalized polyphenylene ether, which is used in Example 14.

The apparatus used in Example 14 is shown in FIG. 4, which apparatus were composed of the same maleic anhydride evaporator A as used in Example 1 and a 10 liter-volume tank B. In the tank A was put 2.0 kg of maleic anhydride. The tank B was packed with glass wool (F1), 1 kg of polyphenylene ether powder was put on the glass wool, and glass wool (F2) was put thereon to prevent the polyphenylene ether powder from scattering in a gas flow. Both A and B were evacuated to 0.1 mmHg or less with a vacuum pump, and the inner atmosphere of each tank was completely purged with nitrogen gas. Both A and B were placed in the respective hot oil baths, whose temperatures were controlled to heat the maleic anhydride in A and the polyphenylene ether in B to 190° C. When the temperatures became steady at 190° C., valves C and D were opened, and nitrogen gas was fed to A through the valve C. As a result, a mixed gas of maleic anhydride and nitrogen was fed to B at a linear velocity of 0.08 m/sec. After 20 minutes from the start of feeding the maleic anhydride/nitrogen mixed gas to the tank B, the valves C and D were closed, and functionalized polyphenylene ether powder was taken out of B. The amount of added maleic anhydride in the functionalized polyphenylene ether was 0.57 part by weight. The color tone measured value was 0.33, and the number of black foreign substance particles was 0.

EXAMPLES 15 TO 20

The procedure of Example 14 was repeated, except for changing the linear velocity of the maleic anhydride/nitrogen mixed gas passing through B and the reaction temperature. The analytical results of the functionalized polyphenylene ether are shown in Table 3.

COMPARATIVE EXAMPLES 7 TO 9

The procedure of Example 14 was repeated, except that the reaction temperature was changed. The polyphenylene ether powder particles were fused together into lumps. The analytical results are shown in Table 3.

EXAMPLES 21 TO 25

The procedure of Example 1 was repeated, except for changing the functionalizing compound put into the evaporator A. The results obtained are shown in Table 4.

COMPARATIVE EXAMPLE 10

Polyphenylene ether powder (2 kg) and solid maleic anhydride (20 g) were mixed well and put into the same tank B as used in Example 1. The tank B was evacuated to 0.1 mmHg by means of a vacuum pump, the valves C and D were closed, and the container was tightly closed while maintaining the reduced pressure. Heated oil was delivered to the jacket of the tank B to control the temperature of the polyphenylene ether/maleic anhydride mixture at 190° C. The mixture was allowed to stand under these conditions for 60 minutes to react. After 60 minutes' standing and reacting, the polyphenylene ether powder was taken out. The amount of added maleic anhydride in the resulting functionalized polyphenylene ether was 0.02 part by weight.

COMPARATIVE EXAMPLE 11

The same Henschel mixer as used in Example 7 was purged with nitrogen, and a mixture of 2 kg of polyphenylene ether powder and 40 g of solid maleic anhydride was put therein. Heated oil was circulated in the jacket of the Henschel mixer to adjust the power temperature in the mixer at 190° C. The stirring blades were rotated at 600 rpm to stir and mix the polyphenylene ether powder. After stirring and mixing for 60 minutes, the powder was taken out from the mixer. The analytical results of the functionalized polyphenylene ether are shown in Table 5.

COMPARATIVE EXAMPLE 12

The procedure of Comparative Example 11 was repeated, except that the powder temperature in the mixer was set at 150° C. The analytical results of the functionalized polyphenylene ether are shown in Table 5.

COMPARATIVE EXAMPLE 13

Figure 5:
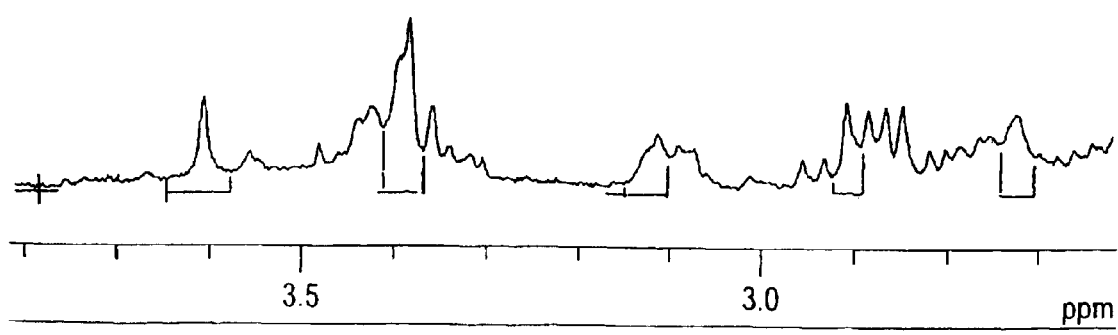
FIG. 5 is a proton NMR spectrum of the functionalized polyphenylene ether obtained in Comparative Example 13.

Polyphenylene ether powder (5 kg) and solid maleic anhydride (100 g) were mixed well, and the mixture was kneaded and extruded at 300° C. by means of a twin-screw extruder ZSK-25 supplied by Werner to obtain pellets. The analytical results of the pellets are shown in Table 5. The proton NMR is shown in FIG. 5.

COMPARATIVE EXAMPLE 14

The procedure of Comparative Example 13 was repeated, except for changing the kneading and extruding temperature to 320° C. The analytical results of the pellets are shown in Table 5.

COMPARATIVE EXAMPLE 15

Polyphenylene ether (2 kg) and toluene (6 kg) were mixed and heated while stirring well until the solution temperature reached 105° C. The stirring was continued for a while and, after confirming that the polyphenylene ether was completely dissolved, 40 g of maleic anhydride was added to the solution. The stirring was continued for 2 hours while keeping the solution temperature at 105° C. Then, the solution temperature was dropped to 60° C., and methanol was added thereto in small portions while stirring, whereupon the system became a slurry. When 5 kg of methanol was added, the solid matter of the slurry was separated by filtration and dried to give functionalized polyphenylene ether powder. The analytical results of the resulting powder are shown in Table 5.

TABLE 1

|  | Reaction Temp. (° C.) | Reaction Time (hr) | Amount of Added Maleic Anhydride (part by weight) | Color Tone Measured Value | Number of Black Foreign Substance Particles | (A)/(B) | Impact Strength (J/m) | Melting Point (° C.) |
|---|---|---|---|---|---|---|---|---|
| Example 1 | 190 | 1 | 0.54 | 0.25 | 0 | 0.0007 | 127 | 235 |
| Example 2 | 190 | 2 | 0.60 | 0.29 | 0 | 0.0016 | 133 | 234 |
| Example 3 | 160 | 1 | 0.38 | 0.32 | 0 | 0.0008 | 115 | 235 |
| Example 4 | 160 | 2 | 0.43 | 0.35 | 0 | 0.0013 | 120 | 235 |
| Example 5 | 120 | 2 | 0.24 | 0.30 | 0 | 0.0008 | 96 | 235 |
| Example 6 | 210 | 0.5 | 0.50 | 0.38 | 0 | 0.0018 | 135 | 235 |
| Compara. Example 1 | 300 | 1 | 0.60 | 3.15 | 51 | 0 | 102 | not observed |
| Compara. Example 2 | 250 | 1 | 0.56 | 2.95 | 16 | 0.00002 | 125 | not observed |

TABLE 1-continued

|  | Reaction Temp. (° C.) | Reaction Time (hr) | Amount of Added Maleic Anhydride (part by weight) | Color Tone Measured Value | Number of Black Foreign Substance Particles | (A)/(B) | Impact Strength (J/m) | Melting Point (° C.) |
|---|---|---|---|---|---|---|---|---|
| Compara. Example 3 | 240 | 1 | 0.52 | 2.53 | 12 | 0.00006 | 130 | not observed |

TABLE 2

|  | Reaction Temp. (° C.) | Reaction Time (hr) | Amount of Added Maleic Anhydride (part by weight) | Color Tone Measured Value | Number of Black Foreign Substance Particles | (A)/(B) | Impact Strength (J/m) | Melting Point (° C.) |
|---|---|---|---|---|---|---|---|---|
| Example 7 | 190 | 0.5 | 0.49 | 0.23 | 0 | 0.0009 | 114 | 235 |
| Example 8 | 190 | 1 | 0.54 | 0.26 | 0 | 0.0018 | 123 | 235 |
| Example 9 | 160 | 0.5 | 0.34 | 0.29 | 0 | 0.0007 | 125 | 235 |
| Example 10 | 160 | 1 | 0.39 | 0.32 | 0 | 0.0015 | 110 | 235 |
| Example 11 | 120 | 1 | 0.22 | 0.27 | 0 | 0.0010 | 92 | 234 |
| Example 12 | 210 | 0.5 | 0.45 | 0.34 | 0 | 0.0020 | 125 | 235 |
| Example 13 | 100 | 2 | 0.24 | 0.25 | 0 | 0.0002 | 88 | 234 |
| Compara. Example 4 | 300 | 0.5 | 0.54 | 2.84 | 45 | 0 | 92 | not observed |
| Compara. Example 5 | 250 | 0.5 | 0.50 | 2.66 | 13 | 0.00002 | 113 | not observed |
| Compara. Example 6 | 240 | 0.5 | 0.47 | 2.28 | 11 | 0.00006 | 117 | not observed |

TABLE 3

|  | Reaction Temp. (° C.) | Gas Linear Velocity (m/sec) | Amount of Added Maleic Anhydride (part by weight) | Color Tone Measured Value | Number of Black Foreign Substance Particles | (A)/(B) | Impact Strength (J/m) | Melting Point (° C.) |
|---|---|---|---|---|---|---|---|---|
| Example 14 | 190 | 0.08 | 0.57 | 0.33 | 0 | 0.0019 | 123 | 235 |
| Example 15 | 190 | 0.02 | 0.35 | 0.26 | 0 | 0.0009 | 92 | 234 |
| Example 16 | 160 | 1.50 | 0.50 | 0.29 | 0 | 0.0006 | 125 | 235 |
| Example 17 | 160 | 0.06 | 0.41 | 0.32 | 0 | 0.0016 | 105 | 235 |
| Example 18 | 160 | 3.50 | 0.60 | 0.27 | 0 | 0.0032 | 130 | 235 |
| Example 19 | 210 | 0.5 | 0.46 | 0.34 | 0 | 0.0023 | 115 | 234 |
| Example 20 | 100 | 8.50 | 0.34 | 0.25 | 0 | 0.0003 | 87 | 235 |
| Compara. Example 7 | 300 | 0.08 | 0.51 | 2.84 | 55 | 0 | 105 | not observed |
| Compara. Example 8 | 250 | 0.08 | 0.54 | 2.66 | 11 | 0.00005 | 103 | not observed |
| Compara. Example 9 | 240 | 0.08 | 0.46 | 2.28 | 19 | 0.00008 | 107 | not observed |

TABLE 4

|  | Functionalizing Compound | Added amount (part by weight) | Color Tone Measured Value | Number of Black Foreign Substance Particles | (A)/(B) | Impact Strength (J/m) | Melting Point (° C.) |
|---|---|---|---|---|---|---|---|
| Example 21 | itaconic anhydride | 0.67 | 0.28 | 0 | 0.0033 | 123 | 235 |
| Example 22 | itaconic acid | 0.45 | 0.29 | 0 | 0.0025 | 82 | 235 |
| Example 23 | methacrylic acid | 0.50 | 0.33 | 0 | 0.0009 | 85 | 235 |
| Example 24 | acrylic acid | 0.41 | 0.37 | 0 | 0.0011 | 78 | 235 |
| Example 25 | fumaric acid | 0.60 | 0.27 | 0 | 0.0025 | 95 | 235 |

TABLE 5

| | Reaction Temp. (° C.) | Reaction Time (hr) | Amount of Added Maleic Anhydride (part by weight) | Color Tone Measured Value | Number of Black Foreign Substance Particles | (A)/(B) | Impact Strength (J/m) | Melting Point (° C.) |
|---|---|---|---|---|---|---|---|---|
| Compara. Example 10 | 190 | 1 | 0.02 | 0.23 | 0 | 0.00002 | 35 | 235 |
| Compara. Example 11 | 190 | 1 | 0.05 | 0.28 | 0 | 0.00003 | 23 | 235 |
| Compara. Example 12 | 150 | 1 | 0.02 | 0.38 | 0 | 0 | 30 | 234 |
| Compara. Example 13 | 300 | — | 0.41 | 3.32 | 53 | 0.00005 | 105 | not observed |
| Compara. Example 14 | 320 | — | 0.60 | 3.27 | 87 | 0 | 130 | not observed |
| Compara. Example 15 | 105 | 2 | 0.15 | 0.35 | 0 | 0.00004 | 42 | 235 |

INDUSTRIAL APPLICABILITY

Having a novel structure that has not been obtained by conventional techniques, the functionalized polyphenylene ether according to the present invention has an excellent color tone, contains little black foreign substance, and provides polymer alloys with superior mechanical characteristics when blended with different polymers, and therefore makes it possible to provide products and parts in various industrial fields that will sufficiently meet the industrial demands.

What is claimed is:

1. A functionalized polyphenylene ether which has in its molecule at least one functional group selected from a carboxyl group, an acid anhydride group, an amino group, an amide group, an imide group, a silyl group, a hydroxyl group and a glycidyl group, and which gives a proton NMR spectrum with a peak area ratio (A)/(B) of 0.0001 or greater, wherein (A) is the area of peaks at chemical shifts from 2.95 to 3.04 ppm, and (B) is the area of peaks at chemical shifts from 6.00 to 6.90 ppm.

2. The functionalized polyphenylene ether according to claim 1, wherein (A)/(B) is 0.001 or greater.

3. The functionalized polyphenylene ether according to claim 1, wherein said functional group is an acid anhydride group.

4. A process for producing a functionalized polyphenylene ether comprising:

allowing polyphenylene ether to react with at least one functionalizing compound having in its molecule (i) at least one carbon-carbon double bond or triple bond and (ii) at least one functional group selected from the group consisting of a carboxyl group, an acid anhydride group, an amino group, an amide group, an imide group, a silyl group, a hydroxyl group and a glycidyl group, wherein said functionalizing compound is supplied in a gaseous state to the polyphenylene ether and allowed to react with the polyphenylene ether of a solid state at or below the melting temperature of the polyphenylene ether.

5. The process for producing a functionalized polyphenylene ether according to claim 4, wherein said functionalizing compound is continuously blown in a gaseous state to the polyphenylene ether.

6. The process for producing a functionalized polyphenylene ether according to claim 5, wherein the gaseous functionalizing compound is blown at a linear velocity of 0.05 m/sec to 10 m/sec with respect to the polyphenylene ether.

7. The functionalized polyphenylene ether according to claim 1, which has a melting point of 200 to 260° C. and is in the form of powder having a particle size of 10 μm to 1,000 μm.

8. The functionalized polyphenylene ether according to claim 2, which has a melting point of 200 to 260° C. and is in the form of powder having a particle size of 10 μm to 1,000 μm.

9. The functionalized polyphenylene ether according to claim 3, which has a melting point of 200 to 260° C. and is in the form of powder having a particle size of 10 μm to 1,000 μm.

10. The process for producing a functionalized polyphenylene ether according to claim 4, wherein the polyphenylene ether has a melting point of 200 to 260° C. and is in the form of powder having a particle size of 10 μm to 1,000 μm.

11. The process for producing a functionalized polyphenylene ether according to claim 5, wherein the polyphenylene ether has a melting point of 200 to 260° C. and is in the form of powder having a particle size of 10 μm to 1,000 μm.

12. The process for producing a functionalized polyphenylene ether according to claim 4, wherein the functionalizing compound is maleic anhydride.

13. The process for producing a functionalized polyphenylene ether according to claim 5, wherein the functionalizing compound is maleic anhydride.

14. The process for producing a functionalized polyphenylene ether according to claim 4, wherein the gaseous functionalizing compound is diluted with an inert gas.

15. The process for producing a functionalized polyphenylene ether according to claim 5, wherein the gaseous functionalizing compound is diluted with an inert gas.

16. The process for producing a functionalized polyphenylene ether according to claim 4, wherein the reaction temperature is 110° C. to 230° C.

17. The process for producing a functionalized polyphenylene ether according to claim 5, wherein the reaction temperature is 110° C. to 230° C.

18. The process for producing a functionalized polyphenylene ether according to claim 4, wherein the reaction temperature is 155° C. to 230° C.

19. The process for producing a functionalized polyphenylene ether according to claim 5, wherein the reaction temperature is 155° C. to 230° C.

20. The process for producing a functionalized polyphenylene ether according to claim 4, wherein the reaction is carried out in a Henschel mixer.

21. The process for producing a functionalized polyphenylene ether according to claim 5, wherein the reaction is carried out in a Henschel mixer.

22. The process for producing a functionalized polyphenylene ether according to claim 4, wherein the reaction is carried out in a paddle drier.

23. The process for producing a functionalized polyphenylene ether according to claim 5, wherein the reaction is carried out in a paddle drier.

* * * * *